US009762705B2

(12) United States Patent
Kim et al.

(10) Patent No.: US 9,762,705 B2
(45) Date of Patent: Sep. 12, 2017

(54) PROBE FRAME FOR SINGLE-INPUT SINGLE-OUTPUT AND MULTI-INPUT MULTI-OUTPUT

(75) Inventors: Joon Bae Kim, Lexington, MA (US); Stuart Sandberg, Acton, MA (US)

(73) Assignee: Lantiq Deutschland GmbH, Neubiberg (DE)

( * ) Notice: Subject to any disclaimer, the term of this patent is extended or adjusted under 35 U.S.C. 154(b) by 224 days.

(21) Appl. No.: 14/131,777

(22) PCT Filed: Jul. 13, 2012

(86) PCT No.: PCT/EP2012/002956
§ 371 (c)(1),
(2), (4) Date: Jan. 9, 2014

(87) PCT Pub. No.: WO2013/007391
PCT Pub. Date: Jan. 17, 2013

(65) Prior Publication Data
US 2014/0140358 A1    May 22, 2014

Related U.S. Application Data

(60) Provisional application No. 61/508,051, filed on Jul. 14, 2011.

(51) Int. Cl.
| H04L 12/28 | (2006.01) |
| H04L 29/06 | (2006.01) |
| H04L 25/02 | (2006.01) |
| H04L 27/26 | (2006.01) |
| H04L 27/34 | (2006.01) |

(52) U.S. Cl.
CPC .......... *H04L 69/22* (2013.01); *H04L 25/0224* (2013.01); *H04L 27/2601* (2013.01); *H04L 27/34* (2013.01)

(58) Field of Classification Search
USPC ......................................... 370/329, 447, 338
See application file for complete search history.

(56) References Cited

U.S. PATENT DOCUMENTS

| 2005/0281241 | A1* | 12/2005 | Webster et al. ............... 370/343 |
| 2006/0245355 | A1* | 11/2006 | Iwamura ............. H04L 12/5695 370/232 |
| 2007/0058732 | A1* | 3/2007 | Riedel ..................... H04B 3/542 375/257 |
| 2007/0135149 | A1 | 6/2007 | Sung et al. |
| 2008/0273613 | A1* | 11/2008 | Kol .......................... H04B 3/54 375/260 |
| 2009/0271550 | A1* | 10/2009 | Clausen ................... H04B 3/32 710/269 |
| 2010/0220813 | A1 | 9/2010 | Abraham et al. |
| 2010/0322166 | A1 | 12/2010 | Sampath et al. |

FOREIGN PATENT DOCUMENTS

| CN | 101087278 A | 12/2007 |
| CN | 101272167 A | 9/2008 |

\* cited by examiner

*Primary Examiner* — Zewdu A Beyen
(74) *Attorney, Agent, or Firm* — Eschweiler & Potashnik, LLC

(57) ABSTRACT

Described herein are implementations related to the generation of probe frames. In one implementation, a generated probe frame includes two symbols, where the two symbols are different. In one implementation, a first of the two symbols is a probe symbol and a second of the two symbols is a quiet symbol.

17 Claims, 5 Drawing Sheets

PROBE FRAME FOR SINGLE-INPUT SINGLE-OUTPUT AND MULTI-INPUT MULTI-OUTPUT

This application claims the benefit of priority to U.S. Provisional Patent Application Ser. No. 61/508,051, filed on Jul. 14, 2011, the disclosure of which is incorporated by reference herein.

Channel estimation in multipoint-to-multipoint networks (e.g., ad-hoc or mesh networks) is usually arranged by sending sounding packets or probe frames. Each such frame generally includes a preamble, header and one or more probe symbols. The purpose of the preamble includes one or more of: 1) enabling the receiver of the frame to detect the frame on the transmission medium, 2) adjusting the gain of the receiver (e.g., an analog front end (AFE)) and synchronizing the clock so that frame is received when expected. The header may carry information to help the receiver to address, demodulate, and decode the frame. The one or more probe symbols allow a receiver to measure the channel (single or composite) by analyzing the received probe symbols. The use of a plurality of probe symbols may provide more accurate channel estimation and better noise averaging.

Because of their ubiquitous nature, powerlines are increasing in popularity as a transmission medium for many networks that use data packet transmission techniques. For example, Power Line Communication (PLC), also called Mains Communication, Power Line Transmission (PLT), Broadband Powerline (BPL), Powerband or Power Line Networking (PLN), is a term describing several different systems for using power distribution wires for simultaneous distribution of data. PLC systems can communicate voice and data by superimposing a signal(s) over standard 50 or 60 Hz alternating current (AC). For indoor applications, PLC equipment can use household electrical power wiring as a transmission medium.

Most AC power outlets have 3 connections, phase (P), neutral (N), ground (G). A PLC system can utilize two independent channels provided by these three connections (e.g., P-N pair for one channel and N-G pair for another channel). Utilizing more than two channels is also possible. Without loss of generality, only two channels are assumed in this disclosure for the simplicity of description and illustration.

A Single-Input Single-Output (SISO) PLC system often utilizes P-N pair for its communication channel because of its ubiquitous availability. However, emerging PLC Multi-Input Multi-Output (MIMO) technology takes advantage of the remaining communication channel(s) to increase spectral efficiency and throughput.

Most deployed SISO and MIMO PLC modems require the use of multiple sounding packets or probe frames that include probe symbols to enable channel estimation and noise averaging. However, proper channel estimation and noise averaging generally requires the receiver to process a plurality of probe frames, which increases transmission overhead and requires the receiver to remain in a channel estimation mode during the processing of the probe frames.

The Detailed Description references the accompanying figures. In the figures, the left-most digit(s) of a reference number identifies the figure in which the reference number first appears. The same numbers are used throughout the drawings to reference like features and components. Also, note that any text smaller than ten point is presented merely to indict where text would appear in the depicted figures. Since such text is merely an indicator of where text might appear, the content of such text is unimportant to the understanding the implementations depicted.

Figure 1:
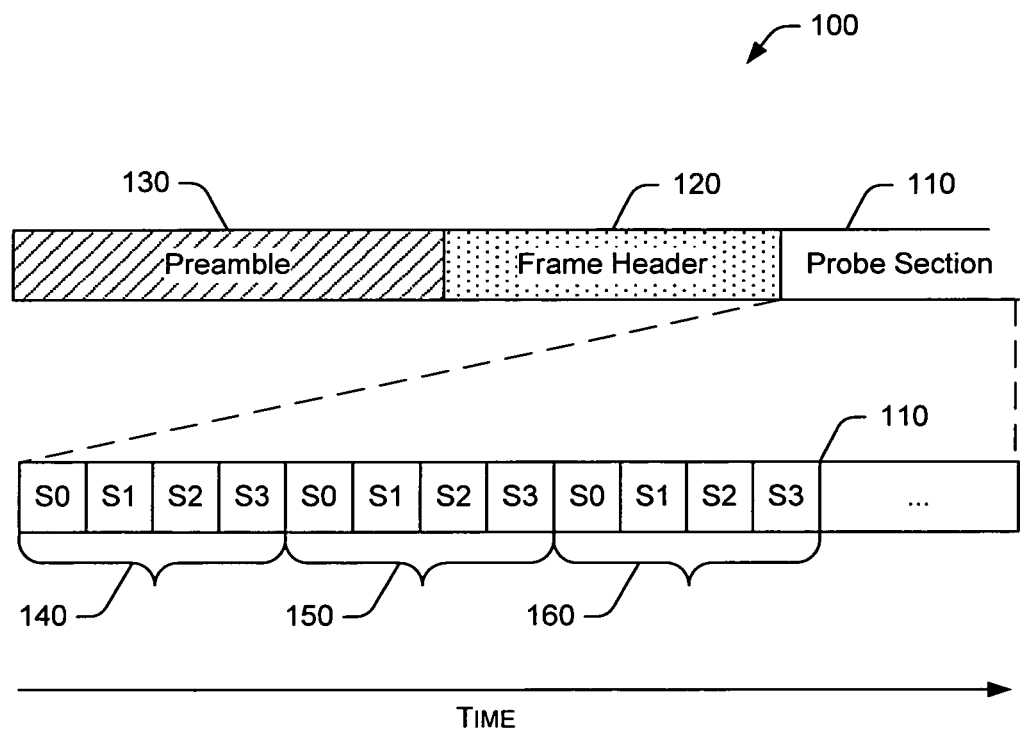
FIG. 1 illustrates a relevant portion of a probe frame or packet used in multicarrier communications system, such as an Orthogonal Frequency-Division Multiplexing (OFDM) based system, that uses Single-Input Single-Output (SISO).

In a first aspect, the invention encompasses an apparatus comprising: a construction unit configured to construct: a probe packet including a probe section, the probe section including at least two symbols, a first symbol of the at least two symbols is different than a second symbol of the at least two symbols; and a transmission unit configured to transmit the probe packet over a communication medium. At least one effect of the foregoing apparatus is that a multicarrier apparatus may be able to obtain an accurate channel estimation with a single probe frame, that may comprise one or more probe packets, transmission and hence reduce the transmission overhead and achieve fast and consistent channel and noise measurements.

In an embodiment of the system according to the invention in the first aspect the probe packet is associated with a Single-Input Single-Output (SISO) frame or a Multi-Input Multi-Output (MIMO) frame.

In an embodiment of the system according to the invention in the first aspect the probe packet further includes a preamble and a header.

In an embodiment of the system according to the invention in the first aspect the first symbol is a probe symbol and the second symbol is a quiet symbol.

In an embodiment of the system according to the invention in the first aspect the probe symbol further includes an associated one or more guard intervals.

In an embodiment of the system according to the invention in the first aspect the first symbol is a probe symbol modulated by a pseudo-random bit sequence (PRBS).

In an embodiment of the system according to the invention in the first aspect the construction unit is further configured to construct another probe packet, the another probe packet having a probe section that is a cyclically shifted version of the probe section of the probe packet.

In an embodiment of the system according to the invention in the first aspect the construction unit is further configured to construct another probe packet, the another probe packet having a probe section that is an inverted version of the probe section of the probe packet.

In an embodiment of the system according to the invention in the first aspect the construction unit is further configured to construct another probe packet, the another probe packet having a probe section that is an inverted and cyclically shifted version of the probe section of the probe packet.

In a second aspect, the invention encompasses a method comprising: constructing, by way of a packet constructing unit embodied in hardware, a probe packet including a probe section, the probe section including at least two symbols, a first symbol of the at least two symbols is different than a second symbol of the at least two symbols; and transmitting the probe packet. At least one effect of the foregoing method is that a multicarrier apparatus implementing the method may be able to obtain an accurate channel estimation with a single probe frame, that may comprise one or more probe packets, transmission and hence reduce the transmission overhead and achieve fast and consistent channel and noise measurements.

In an embodiment of the method according to the invention in the second aspect the constructing constructs another probe packet, the another probe packet having a probe section that is a cyclically shifted version of the probe section of the probe packet.

In an embodiment of the method according to the invention in the second aspect the constructing constructs another probe packet, the another probe packet having a probe section that is an inverted version of the probe section of the probe packet.

In an embodiment of the method according to the invention in the second aspect the constructing constructs another probe packet, the another probe packet having a probe section that is an inverted and cyclically shifted version of the probe section of the probe packet.

In an embodiment of the method according to the invention in the second aspect the constructing constructs the probe packet associated with a Single-Input Single-Output (SISO) frame or a Multi-Input Multi-Output (MIMO) frame.

In an embodiment of the method according to the invention in the second aspect the constructing constructs the probe packet to further includes a preamble and a header.

In an embodiment of the method according to the invention in the second aspect the first symbol is a probe symbol and the second symbol is a quiet symbol.

In an embodiment of the method according to the invention in the second aspect the probe symbol further includes an associated one or more guard intervals.

In an embodiment of the method according to the invention in the second aspect the first symbol is a probe symbol modulated by a pseudo-random bit sequence (PRBS).

Described herein are implementations related to the generation of probe frames. In one implementation, a generated probe frame includes two symbols, where the two symbols are different. In one implementation, a first of the two symbols is a probe symbol and a second of the two symbols is a quiet symbol. By choosing a combination of different types of probe symbols (e.g., probe symbols and silent or quiet symbols) within a single probe frame, the receiver can obtain the accurate channel estimation with a single probe frame transmission and hence reduces the transmission overhead and achieves fast and consistent channel and noise measurements. In an implementation, the payload portion of a probe frame is constructed so that different types of probe symbols are allocated both in time and space domains within a single probe frame.

The described implementations are useful in systems that employ Single-Input Single-Output (SISO) and/or Multi-Input Multi-Output (MIMO). In particular, the various frame implementations described herein enable a receiver of an implementation specific frame to reliably measure the channel characteristics, generate channel estimation parameters, select of parameters such as bit allocation table (BAT), determine PSD ceiling, resolve FEC coding rate and/or codeword size, etc. Again, the frames implemented by the described implementations are compatible with Single-Input Single-Output (SISO) systems, support various MIMO schemes, e.g., space time diversity and spatial multiplexing, and enable simplified transceiver design.

Exemplary Implementation and Operation

An Orthogonal Frequency-Division Multiplexing (OFDM) is often used as a digital multi-carrier modulation approach for various communications media. OFDM-based networking/transmission systems utilize multiple subcarriers to transport information from one particular node to another. OFDM is sometimes referred to as multi-carrier or discrete multi-tone modulation. An OFDM-based system divides a high-speed serial information signal into multiple lower-speed sub-signals that the system transmits simultaneously at different frequencies in parallel.

The approach is orthogonal because of the spacing which prevents the demodulators from seeing frequencies other than their own. The benefits of OFDM are high spectral efficiency, resiliency to radio frequency (RF) interference, and lower multi-path distortion. This is useful because in a typical terrestrial broadcasting scenario there are multipath-channels (i.e., the transmitted signal arrives at the receiver using various paths of different length).

FIG. 1 illustrates a relevant portion of a probe frame or packet 100 used in an OFDM-based system that uses Single-Input Single-Output (SISO). In this disclosure, the terms frame and packet may be used synonymously. The probe packet 100 includes a probe section 110, a header 120 and a preamble 130. In this disclosure, the term probe frame or packet denotes a particular type of packet that is used by a transmitter and/or receiver. That is, probe frames or packets are used by transmitters and receivers for a number of reasons including, but not limited to, measuring the channel characteristics, channel estimation, selection of parameters such as bit allocation table (BAT), guard interval (also known as cyclic prefix), PSD ceiling, FEC coding rate and/or codeword size, etc. More generally, probe symbols are predefined symbols that do not carry data and can be used by the receiver and/or transmitter for channel probing. In one exemplary embodiment, the probe symbols are generated by modulating a predefined pseudo-random bit sequence (PRBS). For example, a plurality of sub-carriers of the probe symbol can be modulated by a predefined PRBS that is known by the transmitter and/or the receiver.

The preamble 130 is the first part of the packet 100, and intended so that the receiver can detect the presence of the packet 100 on the medium, adjust the gain of Analog Front End (AFE), and synchronize the clock. The header 120 carries necessary information for the receiver to address, demodulate, and decode, as necessary, the probe section 110.

The probe section 110 may be comprised of multiple probe symbols 140, 150 and 160. Three probe symbols 140, 150 and 160 are shown, but greater or fewer symbols may be implemented in the probe section 110. Each of the symbols 140, 150 and 160 may include portions or sections, which are denoted by SN, where N equals the section number. Each SN may comprise information, in bits, or any other unit of information (e.g., kbits, bytes, etc.). Furthermore, the sections associated with each of the symbols 140, 150 and 160 may comprise quiet information, Quadrature amplitude modulation (QAM) information modulated with pseudo-random sequences or random sequences, guard intervals having the same or different symbol lengths, cyclically shifted and/or inverted information, and precoding.

In one example, precoding is a technique used to mitigate the effects of crosstalk in a system. Essentially, interference caused by crosstalk is pre-compensated for (or canceled out) at the transmitter before transmission of information. In another example, precoding is a type of beamforming that leverages spatial diversity. In single layer beamforming, the same signal is emitted from each of the transmit antennas with appropriate phase and/or gain weighting such that the signal power is maximized at the receiver input. The benefits of beamforming are to increase the received signal gain, by making signals emitted from different antennas add up constructively, and to reduce the multipath fading effect. When the receiver has multiple antennas, the transmit beamforming cannot simultaneously maximize the signal level at all of the receive antennas, and multi-layer beamforming is used. In general, precoding requires knowledge of channel state information (CSI) at the transmitter.

In one implementation, the symbol 140 may comprise quiet information, the symbol 150 may comprise quiet information, and the symbol 160 may comprise probe information. Probe symbols, such as the symbol 160, are predefined symbols that do not carry data and can be used by the receiver and/or transmitted for channel probing. In one exemplary embodiment, the probe symbols are generated by modulating a predefined PRBS. For example, a plurality of sub-carriers of the probe symbol can be modulated by a predefined PRBS that is known by the transmitter and/or the receiver. Quiet symbols, such as symbols 140 and 150, are symbols that essentially include no energy thereby enabling a receiver to determine the noise related information (e.g., a noise floor) associated with a communication network. Furthermore, any one of the symbols 140, 150 and 160 may be preceded and/or followed by one or more guard intervals.

In the example illustrated in FIG. 1, each of the symbols 140, 150 and 160 includes the same number of sections S0-S3. However, the symbols 140, 150 and 160 may have other quantities of sections than those illustrated.

The probe frame or packet 100 illustrated in FIG. 1 is effective in SISO systems. However, in MIMO systems, at least two probe frames or packets 100 are required. For MIMO systems, the same probe frame or packet as illustrated in FIG. 1 may be used for channel #2, where the probe frame or packet includes symbols inverted and/or cyclically shifted with respect to symbols associated with the probe frame or packet of channel #1. A MIMO embodiment is discussed in connection with FIG. 2.

Figure 2:
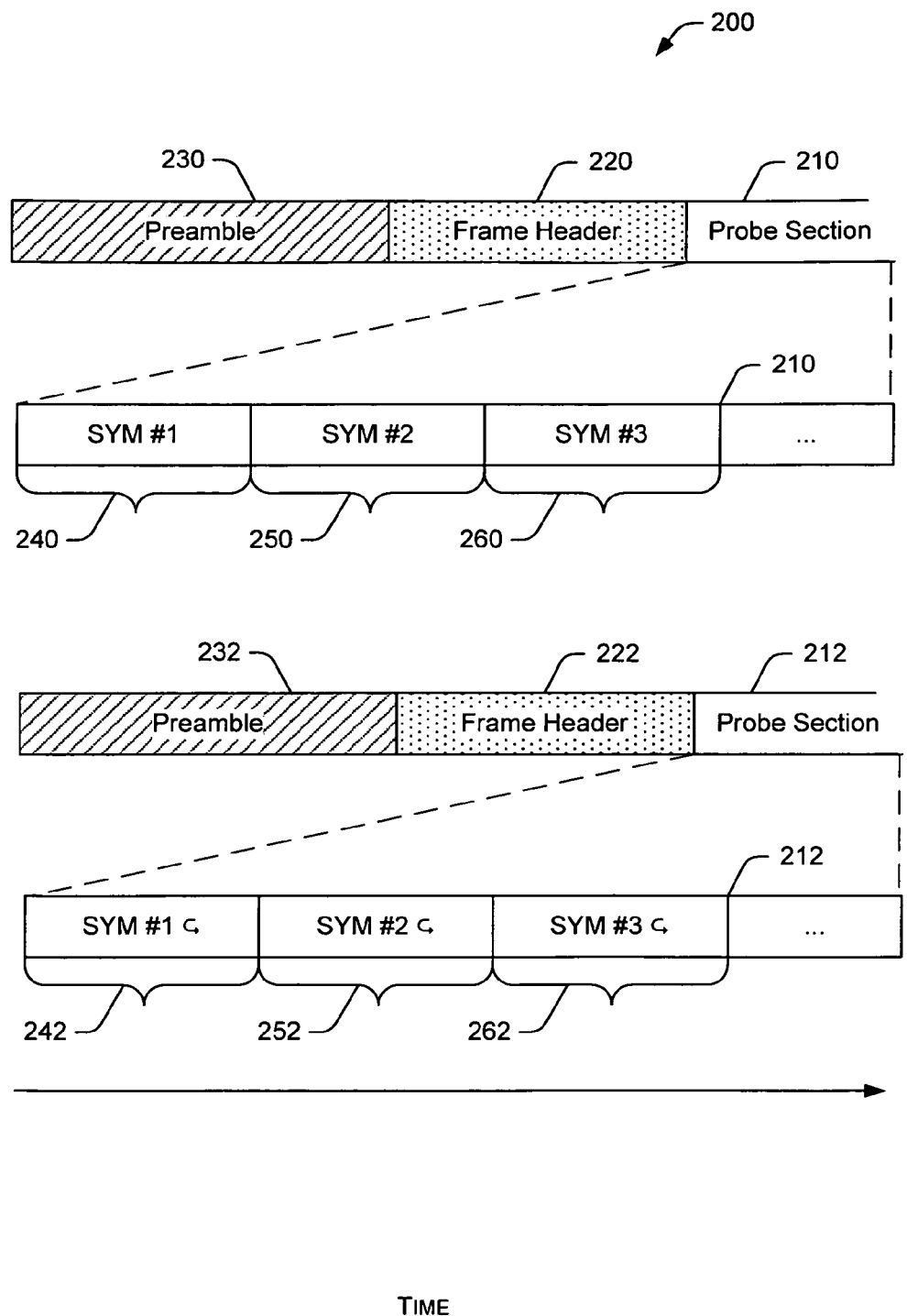
FIG. 2 illustrates a relevant portion a probe frame or packet used in multicarrier communications system, such as an OFDM-based system, that uses Multi-Input Multi-Output (MIMO).

FIG. 2 illustrates a relevant portion of probe frames or packets 200 used in an OFDM-based system that uses MIMO. In this disclosure, multiple probe frames or packets, such as probe frames or packets 200, may be referred to as a MIMO frame or simply a frame. The channel #1 probe frame or packet includes a probe section 210 and a header 220. A preamble 230 is prepended to or associated with the frame. Similarly, the channel #2 probe frame or packet includes a probe section 212 and a header 222. A preamble 232 is prepended to or associated with the frame.

The preambles 230 and 232 are intended so that the receiver can detect the presence of the frame on the medium, adjust the gain of the AFE, and synchronize the clock. The headers 220 and 222 carry necessary information for the receiver to address, demodulate, and decode the probe sections 210 and 212, respectively.

In a MIMO system, the MIMO frame includes at least two probe frames or packets that are transmitted simultaneously over two channels (e.g., channel #1 and #2). In a PLC system, P-N pair may be used channel #1 and N-G pair for channels #2. As indicated previously herein, the present disclosure generally describes MIMO frames that include two probe frames or packets. However, the described MIMO frames may also be implemented with more than two probe frames or packets in order to accommodate more than two channels.

The probe section 210 of the first of the two channels may be comprised of multiple symbols 240, 250 and 260. Three symbols 240, 250 and 260 are shown, but greater or fewer symbols may be implemented in the probe section 210. Each of the symbols 240, 250 and 260 may include portions or sections (SN) similar to those illustrated in FIG. 1. Each SN may comprise information, in bits, or any other unit of information (e.g., kbits, bytes, etc.). Furthermore, the sections associated with each of the symbols 240, 250 and 260 may comprise quiet information, Quadrature amplitude modulation (QAM) information modulated with pseudo-random sequences or random sequences, guard intervals having the same or different symbol lengths, cyclically shifted and/or inverted information, and precoding.

In one example, precoding is a technique used to mitigate the effects of crosstalk in a system. Essentially, interference caused by crosstalk is pre-compensated for (or canceled out) at the transmitter before transmission of information. In another example, precoding is a type of beamforming that leverages spatial diversity. In single layer beamforming, the same signal is emitted from each of the transmit antennas with appropriate phase and/or gain weighting such that the signal power is maximized at the receiver input. The benefits of beamforming are to increase the received signal gain, by making signals emitted from different antennas add up constructively, and to reduce the multipath fading effect. When the receiver has multiple antennas, the transmit beamforming cannot simultaneously maximize the signal level at all of the receive antennas, and multi-layer beamforming is used. In general, precoding requires knowledge of channel state information (CSI) at the transmitter. Furthermore, any one of the symbols 240, 250 and 260 may be preceded and/or followed by one or more guard intervals.

Similarly, the probe section 212 of the second of the two channels may be comprised of multiple symbols 242, 252 and 262. Three symbols 242, 252 and 262 are shown, but greater or fewer symbols may be implemented in the probe section 212. Each of the symbols 242, 252 and 262 may include portions or sections (SN) similar to those illustrated in FIG. 1. Each SN may comprise information, in bits, or any other unit of information (e.g., kbits, bytes, etc.). Furthermore, the sections associated with each of the symbols 242, 252 and 262 may comprise quiet information, Quadrature amplitude modulation (QAM) information modulated with pseudo-random sequences or random sequences, guard intervals having the same or different symbol lengths, cyclically shifted and/or inverted information, and precoding.

In one example, precoding is a technique used to mitigate the effects of crosstalk in a system. Essentially, interference caused by crosstalk is pre-compensated for (or canceled out) at the transmitter before transmission of information. In another example, precoding is a type of beamforming that leverages spatial diversity. In single layer beamforming, the same signal is emitted from each of the transmit antennas with appropriate phase and/or gain weighting such that the signal power is maximized at the receiver input. The benefits of beamforming are to increase the received signal gain, by making signals emitted from different antennas add up constructively, and to reduce the multipath fading effect. When the receiver has multiple antennas, the transmit beamforming cannot simultaneously maximize the signal level at all of the receive antennas, and multi-layer beamforming is used. In general, precoding requires knowledge of channel state information (CSI) at the transmitter. Furthermore, any one of the symbols 242, 252 and 262 may be preceded and/or followed by one or more guard intervals.

In the embodiment shown in FIG. 2, symbol 242 is a cyclically shifted version of symbol 240, symbol 252 is a cyclically shifted version of symbol 250 and symbol 262 is a cyclically shifted version of symbol 260. In addition, in an embodiment, the preamble 232 is a cyclically shifted version of preamble 230 and header 222 is a cyclically shifted version of header 220.

In another embodiment related to FIG. 2, symbol 242 is a cyclically shifted and inverted version of symbol 240, symbol 252 is a cyclically shifted and inverted version of symbol 250 and symbol 262 is a cyclically shifted and inverted version of symbol 260. In addition, in an embodiment, the preamble 232 is a cyclically shifted and inverted version of preamble 230 and header 222 is a cyclically shifted and inverted version of header 220.

In another embodiment related to FIG. 2, symbol 242 is a cyclically shifted and inverted version of symbol 240, symbol 252 is a cyclically shifted version of symbol 250 and symbol 262 is a cyclically shifted and inverted version of symbol 260. In addition, in an embodiment, the preamble 232 is a cyclically shifted and inverted version of preamble 230 and header 222 is a cyclically shifted and inverted version of header 220.

FIGS. 1 and 2 illustrate exemplary SISO and MIMO probe frame implementations that may be used for channel estimation and channel adaptation. The particular illustrated described probe frames are provided for illustration purposes only.

That is, various other probe frames may be implemented and fall within the scope of the invention.

Exemplary Network Communications Arrangement

An exemplary communication arrangement may employ at least two multicarrier apparatuses or nodes. The exemplary communication arrangement may also employ a multicarrier controller apparatus or controller node. In one implementation, the multicarrier apparatuses/controller are OFDM apparatuses capable of implementing the herein described techniques and implementations. In another implementation, the exemplary communication arrangement employs apparatuses or nodes that communicate via a wired/wireless medium by way of one or more communication protocols.

The multicarrier apparatuses may communicate through a communication channel. The communication channel may be realized as one or more wireless communication media, one or more wireline communication media (e.g., coaxial cable, twisted pair of copper wires, powerline wiring, Ethernet cabling, optical fiber, etc.), or combinations thereof. Accordingly, the multicarrier apparatuses may include structure and functionality that enable signal communication over such media. Such structure and functionality may include one or more antennas, integrated wireline interfaces, and the like. Such structure and functionality may employ multiple differing wireline media (e.g., coaxial cable and powerline wiring). Depending on the implementation, the multicarrier apparatuses may communicate with one another directly (peer-to-peer mode) or the multicarrier apparatuses may communicate via the controller apparatus. The multicarrier apparatuses may be SISO and/or MIMO capable devices.

A family of networking standards called G.hn has been proposed by the International Telecommunication Union's Standardization arm (ITU-T) and promoted by the Home-Grid Forum. One or more of the G.hn specifications define networking over both wireline (e.g., powerlines, phone lines and coaxial cables) and wireless networks. The G.hn specifications specify standards by which multicarrier apparatuses may communicate via such communications channels. The techniques described herein may be employed with those G.hn specifications or other specifications.

Figure 3:
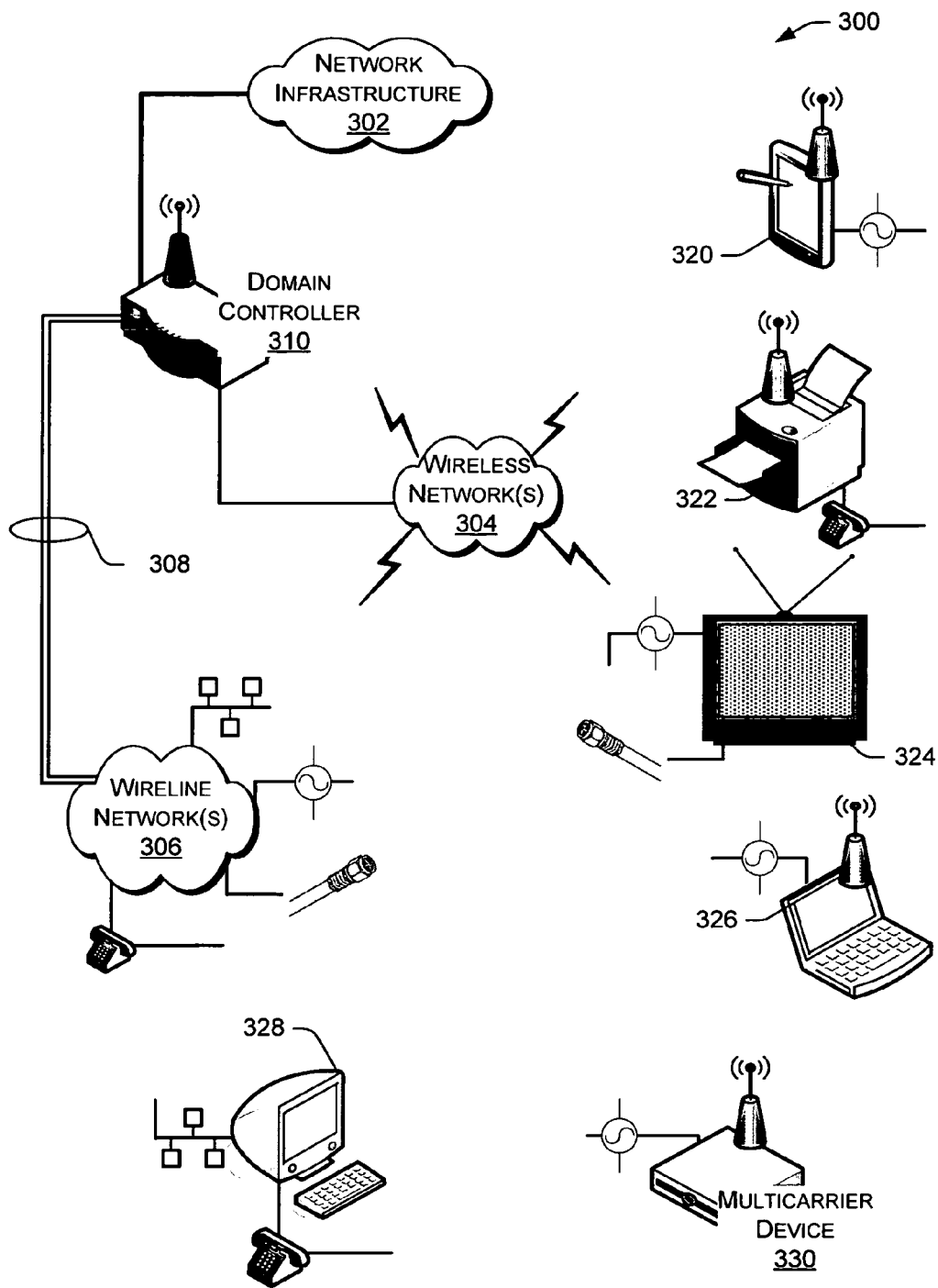
FIG. 3 shows an exemplary networking communications arrangement in which one or more implementations of the techniques described herein may be employed.

FIG. 3 shows an exemplary networking communications arrangement 300 in which one or more implementations may be employed. The multicarrier controller apparatus of the arrangement 300 is an access point 310 or domain controller of a home networking environment. As shown in FIG. 3, the access point 310 may be a residential gateway that distributes broadband services from a connected network infrastructure 302 (e.g., the Internet) to various multicarrier apparatuses via one or more wireless networks 304 and one or more wireline networks 306. The wireless networks 304 may also be called wireless local area networks (WLAN) and the wireline networks 306 may be called local area networks (LANs).

The various multicarrier apparatuses depicted in FIG. 3 include a tablet computer 320, a network printer 322, a television 324, a laptop computer 326, a desktop computer 328, and a generic multicarrier apparatus or device 330 (e.g., a digital video recorder (DVR) and Internet TV device). The multicarrier apparatuses may be associated with digital content destinations in the home, but may also be associated with digital content sources, such as digital video recorders (DVR), computers providing streaming video, televisions, entertainment centers, and the like.

As depicted, the tablet computer 320 is configured to communicate via both wireless and powerline wireline networks, the network printer 322 is configured to communicate via wireless and/or twisted-pair cabling (e.g., telephone wiring) based wireline networks, the television 324 is configured to communicate via either of two different wireline networks (e.g., coaxial cabling and/or powerline cabling based), the laptop computer 326 communicates via powerline based wireline and/or wireless networks, and the desktop computer 328 is configured to communicate via an Ethernet cabling based wireline network and/or twisted-pair cabling (e.g., telephone wiring) based wireline networks. Similarly, the multicarrier device 330 is configured to communicate via wireless and/or powerline-based wireline networks. As depicted, the wireline networks 306 include one or more wireline networks based upon Ethernet cabling (e.g., Cat-5), powerline wiring, coaxial cabling, and/or telephone cabling. As represented by multiple wire connections 306, the domain controller 310 is connected via multiple different wirings to the multiple different wireline networks 306.

Furthermore, the multicarrier apparatuses may be enabled to communicate using packet-based technology (e.g., ITU G.hn, HomePNA, HomePlug® AV and Multimedia over Coax Alliance (MoCA)) and xDSL technology). Such xDSL technology may include Asymmetric Digital Subscriber Line (ADSL), ADSL2, ADSL2+, Very high speed DSL (VDSL), VDSL2, G.Lite, and High bit-rate Digital Subscriber Line (HDSL). In addition, some multicarrier apparatuses (such as 320, 322, 326, and 330) may be enabled to communicate using IEEE 802.11 and IEEE 802.16 (WiMAX) wireless technologies.

Signals exchanged between the multicarrier apparatuses may include multicarrier symbols that each include a plurality of tones or sub-channels. Each of the tones within a multicarrier symbol may have data bits modulated thereon that are intended for delivery from one of the multicarrier apparatuses to another.

Exemplary Network Device Employing Robust Preamble Techniques

Figure 4:
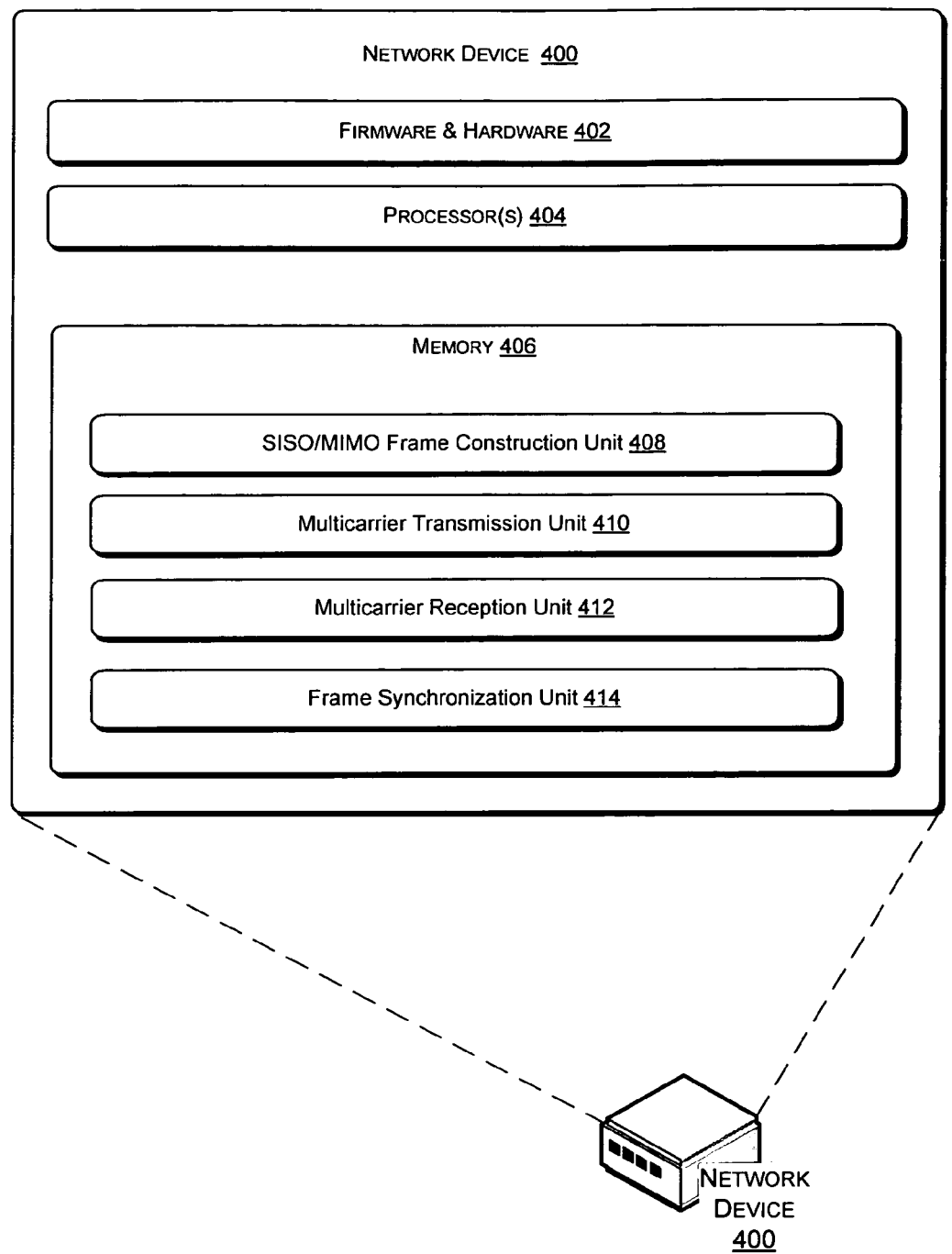
FIG. 4 shows an exemplary network device configured to employ the implementations described herein.

FIG. 4 shows an exemplary network device 400 configured to employ the implementations described herein. The network device 400 may be, for example, a network controller, a multicarrier controller apparatus (such as the access point 310 in FIG. 3), and/or a multicarrier apparatus (such as 320-330 of FIG. 3).

The network device 400 is depicted, in FIG. 4, in an expanded view to better show some of the relevant components therein. The network device 400 may include firmware & hardware 402, one or more processors 404, and a memory 406. The network device 400 has one or more modules of processor-executable instructions stored in the memory 406. The network device 400 may include a MIMO (and SISO) construction unit 408, a multicarrier transmission unit 410, a multicarrier reception unit 412, and a frame synchronization unit 414.

The SISO/MIMO frame construction unit 408 constructs a SISO or MIMO frame, at least in part, in accordance with one or more of the implementations described herein. When constructed, the SISO or MIMO frame may have one or at least two at least two probe packets for transmission to one or more receivers.

The multicarrier transmission unit 410 is configured to transmit the SISO or MIMO frame over a communications medium. That communication medium may be a communication medium, such as a powerline. An OFDM transceiver is an example of a suitable device for the multicarrier transmission unit 410.

The multicarrier reception unit 412, such as the OFDM transceiver, receives a SISO or MIMO frame having a structure in accordance with at least one implementation described herein and via a communications medium, such as powerline.

The frame synchronization unit 414 monitors the incoming preambles of a SISO or MIMO frame. Based upon one or more preambles, the unit 414 calculates/predicts when the frame will start. The reception unit 412 can begin receiving the frame at the predicted time.

While the network device 400 is described herein in terms of modules and sub-modules of processor-executable instructions, the functionalities of these modules and sub-modules may be implemented in software, hardware, firmware, or a combination thereof.

Exemplary Processes

Figure 5:
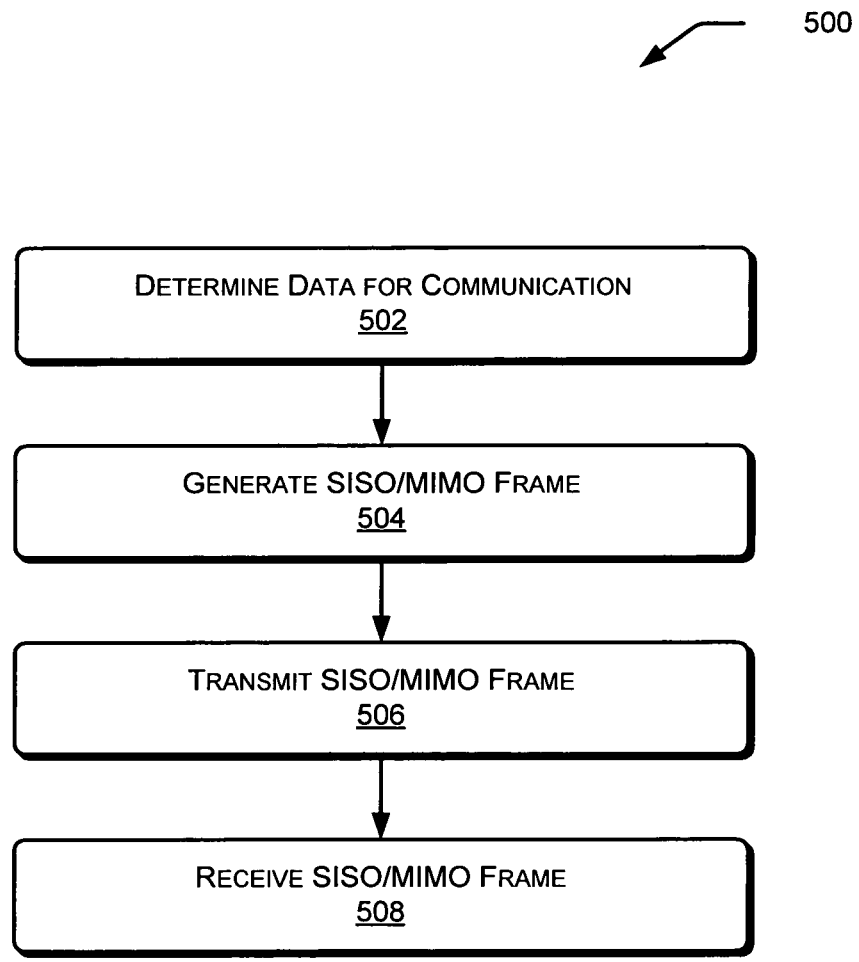
FIG. 5 is a flowchart of a process that is configured to implement the implementations described herein.

FIG. 5 is a flowchart illustrating an exemplary process 500 that implements the implementations described herein. The exemplary process 500 may be performed, at least in part, by a networking device such as a multicarrier controller apparatus (e.g., the domain controller 310 or television 324 of FIG. 3), a multicarrier apparatus (e.g., the device 330 of FIG. 3), and/or network device 400 of FIG. 4. Operation of the process 500 may reference previously introduced elements and description related to the drawing figures, such as FIGS. 1-4.

FIG. 5 includes process 500, which generates a SISO or MIMO frame in accordance with the implementations described herein. Typically, this process 500 is performed by a network device performing a multicarrier transmission over a communication medium, such as powerline.

At 502, the process 500 begins with determining that a one or more probe frames are for communication to a receiver, such as a multicarrier device (e.g., network device 400).

At 504, the multicarrier device generates a SISO or MIMO frame in accordance with one of the implementations described herein. For example, the SISO or MIMO frame may generated as described and illustrated in FIGS. 1-2.

At 506, the multicarrier device transmits the SISO or MIMO frame generated at block 504 on a communication medium, such as powerline.

At 508, a multicarrier device receives the SISO or MIMO frame via the communication medium.

Additional and Alternative Implementation Notes

Exemplary implementations discussed herein may have various components collocated; however, it is to be appreciated that the various components of the arrangement may be located at distant portions of a distributed network, such as a communications network and/or the Internet, or within a dedicated secure, unsecured and/or encrypted arrangement. Thus, it should be appreciated that the components of the arrangements may be combined into one or more apparatuses or collocated on a particular node of a distributed network, such as a telecommunications network. Moreover, it should be understood that the components of the described arrangements may be arranged at any location within a distributed network without affecting the operation of the arrangements. Similarly, one or more functional portions of the arrangement may be distributed between a modem and an associated computing device.

The above-described implementations, arrangements, apparatuses and methods may be implemented in firmware, hardware, software, one or more software modules, one or more software and/or hardware testing modules, one or more telecommunications test devices, one or more DSL modems, one or more ADSL modems, one or more xDSL modems, one or more VDSL modems, one or more linecards, one or more G.hn transceivers, one or more MOCA transceivers, one or more Homeplug transceivers, one or more powerline modems, one or more wired or wireless modems, test equipment, one or more multicarrier transceivers, one or more wired and/or wireless wide/local area network systems, one or more satellite communication systems, network-based communication systems (such as an IP, Ethernet or ATM system), one or more modems equipped with diagnostic capabilities, or the like, or on one or more separate programmed general purpose computers having a communications device or in conjunction with any of the following communications protocols: CDSL, ADSL2, ADSL2+, VDSL1, VDSL2, HDSL, DSL Lite, IDSL, RADSL, SDSL, UDSL, MOCA, G.hn, Homeplug or the like.

Additionally, the implementations, arrangements, procedures and protocols of the described implementations may be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable device, or the like. In general, any apparatus capable of implementing a state machine that is in turn capable of implementing the methodology described and illustrated herein may be used to implement the various communication methods, protocols and techniques according to the implementations.

Furthermore, the disclosed implementations and procedures may be readily implemented in software using object or object-oriented software development environments that provide a portable source code that can be used on a variety of computer or workstation platforms. Alternatively, the disclosed arrangements may be implemented partially or fully in hardware using standard logic circuits or VLSI design. The communication arrangements, procedures and protocols described and illustrated herein may be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed procedures may be readily implemented in software that can be stored on a computer-readable storage medium, executed on a programmed general-purpose computer with the cooperation of a controller and memory, a special purpose computer, a microprocessor, or the like. In these instances, the arrangements and procedures of the described implementations may be implemented as a program embedded on a personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system.

The implementations herein are described in terms of exemplary embodiments. However, it should be appreciated that individual aspects of the implantations may be separately claimed and one or more of the features of the various embodiments may be combined. In the above description of exemplary implementations, for purposes of explanation, specific numbers, materials configurations, and other details are set forth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The exemplary processes discussed herein are illustrated as a collection of blocks in a logical flow graph, which represents a sequence of operations that can be implemented with hardware, software, firmware, or some combination thereof. In the context of software/firmware, the blocks represent instructions stored on one or more processor-readable storage media that, when executed by one or more processors, perform the recited operations. The operations of the exemplary processes may be rendered in virtually any programming language or environment including (by way of example and not limitation): C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like. Moreover, the described implementations may be similarly executed and realized by way of such hardware, software, firmware, or some combination thereof.

Note that the order in which the implementations and processes are described is not intended to be construed as a limitation, and any number of the described implementations and processes may be combined.

The term "processor-readable media" includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

For the purposes of this disclosure and the claims that follow, the terms "coupled" and "connected" may have been used to describe how various elements interface. Such described interfacing of various elements may be either direct or indirect.

What is claimed is:

1. An apparatus, comprising:
   a construction circuit configured to construct a probe packet including a preamble section, a header section following the preamble section, and a probe section following the header section, wherein the preamble section operates to facilitate a detection of the probe packet by a receiver and the header section operates to facilitate a demodulation or decoding of received information at the receiver, the probe section including at least two symbols, a first symbol of the at least two symbols being different than a second symbol of the at least two symbols, wherein the first symbol is a probe symbol and the second symbol is a quiet symbol; and
   a transmission circuit configured to transmit the probe packet over a powerline.

2. The apparatus of claim 1, wherein the probe packet is associated with a Single-Input Single-Output (SISO) frame or a Multi-Input Multi-Output (MIMO) frame.

3. The apparatus of claim 1, wherein the probe symbol further includes one or more guard intervals.

4. The apparatus of claim 1, wherein the first symbol is a probe symbol modulated by a pseudo-random bit sequence (PRBS).

5. The apparatus of claim 1, wherein the construction circuit is further configured to construct another probe packet having a probe section that is a cyclically shifted version of the probe section of the probe packet.

6. The apparatus of claim 5,
   wherein the transmission circuit is configured to transmit the probe packet over a first channel of a powerline, and to transmit the another probe packet over a second channel of the powerline, the second channel being independent from the first channel.

7. The apparatus of claim 6,
wherein the first channel is a channel using a phase connection and a neutral connection, and the second channel is a channel using the neutral connection and a ground connection.

8. The apparatus of claim 1, wherein the construction circuit is further configured to construct another probe packet having a probe section that is an inverted version of the probe section of the probe packet.

9. The apparatus of claim 8,
wherein the transmission circuit is configured to transmit the probe packet over a first channel of a powerline, and to transmit the another probe packet over a second channel of the powerline, the second channel being independent from the first channel.

10. The apparatus of claim 9,
wherein the first channel is a channel using a phase connection and a neutral connection, and the second channel is a channel using the neutral connection and a ground connection.

11. The apparatus of claim 1, wherein the construction circuit is further configured to construct another probe packet having a probe section that is an inverted and cyclically shifted version of the probe section of the probe packet.

12. The apparatus of claim 11,
wherein the transmission circuit is configured to transmit the probe packet over a first channel of a powerline, and to transmit the another probe packet over a second channel of the powerline, the second channel being independent from the first channel.

13. A method, comprising:
constructing, by way of a packet constructing circuit embodied in hardware, a probe packet including a preamble section, a header section following the preamble section, and a probe section following the header section, wherein the preamble section operates to facilitate a detection of the probe packet by a receiver and the header section operates to facilitate a demodulation or decoding of received information at the receiver, the probe section including at least two symbols, a first symbol of the at least two symbols being different than a second symbol of the at least two symbols, wherein the first symbol is a probe symbol and the second symbol is a quiet symbol; and
transmitting the probe packet over a powerline.

14. The method of claim 13, wherein the probe symbol further includes one or more guard intervals.

15. The method of claim 13, further comprising:
constructing, by way of the packet constructing circuit, another probe packet having a probe section that is a cyclically shifted version of the probe section of the probe packet.

16. The method of claim 13, further comprising:
constructing, by way of the packet constructing circuit, another probe packet having a probe section that is an inverted version of the probe section of the probe packet.

17. The method of claim 13, further comprising:
constructing, by way of the packet constructing circuit, another probe packet having a probe section that is an inverted and cyclically shifted version of the probe section of the probe packet.

* * * * *